US006310293B1

(12) United States Patent
Kawakita

(10) Patent No.: US 6,310,293 B1
(45) Date of Patent: Oct. 30, 2001

(54) STACKED ASSEMBLY

(75) Inventor: Shinji Kawakita, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/469,529

(22) Filed: Dec. 22, 1999

(30) Foreign Application Priority Data

Dec. 24, 1998 (JP) ........................................ 10-366949

(51) Int. Cl.[7] ........................................ H02G 3/00
(52) U.S. Cl. .................... 174/99 B; 174/68.2; 174/70 B
(58) Field of Search ........................ 174/99 B, 68.2, 174/70 B, 71 B, 72 B, 149 B, 151; 361/611, 648

(56) References Cited

U.S. PATENT DOCUMENTS 3,751,578 * 8/1973 Hoffmann ........................ 174/99 B
4,199,655 * 4/1980 Shariff et al. .................... 174/72 B
4,825,336 * 4/1989 Iio et al. ........................ 361/355
5,337,211 * 8/1994 Reiner et al. .................... 361/637

FOREIGN PATENT DOCUMENTS 2293052 3/1995 (GB) .
2318226 3/1995 (GB) .
2103723 8/1990 (JP) .

* cited by examiner

*Primary Examiner*—Dean A. Reichard
*Assistant Examiner*—Angel R. Estrada
(74) *Attorney, Agent, or Firm*—Bierman, Muserlian and Lucas

(57) ABSTRACT

An insulative plate is fixed to a bus bar stacked substrate by inserting projection formed on the bus bar into projection entry section, shaped like a covered box, on the insulative plate. By pressing the insulative plate onto the bus bar stacked substrate the projection is pushed into the projection entry section and the insulative plate is securely fixed to the bus bar.

3 Claims, 4 Drawing Sheets

STACKED ASSEMBLY

BACKGROUND OF THE INVENTION

1. Technical Field of the Invention

The present invention relates to a stacked assembly having a bus bar and, more particularly, to an arrangement wherein a top insulating plate is securely held to the lower substrate without the need for welding.

2. Art Relating to the Invention

Conventionally, electrical connection boxes are used as connection junction points for wire harnesses and the like while also housing various electronic circuits, electronic components, and the like for automobiles.

Electrical connection boxes often house a stacked assembly as shown in FIG. 5. In FIG. 5, stacked assembly 51 includes bus bar stacked substrate 52, insulative plate 53, and plurality of solid-core wires 54. Bus bar stacked substrate 52 forms one portion of an internal circuit and includes a plurality of stacked insulative substrates 56, 57, 58. Bus bars 61 are fixed above the insulative substrate 56, between insulative substrates 56, 67, 58, and below insulative substrate 58. Bus bars 61 include plate-shaped bus bar tabs 62, which are bent perpendicular to both the direction in which bus bars 61 are laid, and supporting bus bar tabs 63. Bus bar tabs 63 have sections 63*a* which form a pincer shape for connecting to solid core wires 54.

Insulative plate 53 is mounted on top of a portion of bus bar stacked substrate 52. Insulative plate 53 is formed in a plate shape that covers a portion of insulative substrate 56 that portion being the part that has bus bar tabs 63. Tab holders 66 are formed in insulative plate 53 and align with bus bar tabs 63. Tab holders 66 are formed with tab insertion openings 69, which have widths that are slightly greater than the widths of bus bar tabs 63. When insulative plate 53 is mounted on bus bar stacked substrate 52, bus bar tabs 63 are inserted through tab insertion openings 69. When this is done, the ends of supporting sections 63*a* are projected from the upper end of tab holder 66.

Solid-core wires 54 are connected to bus bar tabs 63. In this process of assembly, the insulative covering on solid-core wire 54 is cut away by supporting section 63*a*, thus forming an electrical connection between solid-core wire 54 and bus bar tab 63.

With the above operation, bus bar 61 and solid-core wire 54 are electrically connected, and an electrical circuit is formed on the upper surface of insulative plate 53, thus forming the internal circuit in stacked assembly 51.

Stacked assembly 51 is interposed and loosely fixed between an upper case and a lower case (not shown in the figure) and is housed inside the electrical connection box.

One of the problems associated with stacked assembly 51 is that insulative plate 53 can disengage from bus bar stacked substrate 52 thereby also disengaging solid-core wires 54. This can result in time-consuming operation of re-wiring solid-core wires 54.

Also, stacked assembly 51, housed in the electrical connection box, is only loosely held by the upper case and the lower case. Thus, bus bar stacked substrate 52 and insulative plate 53 can become misaligned due to the leeway provided by the clearance and the vibrations that are inherent in an automobile when it is being operated. This can lead to bad connections between bus bars 61 and solid-core wires 54. This also requires re-wiring solid-core wires 54.

One measure that has been taken to prevent these types of bad connections is to weld bus bar substrate 52 to insulative plate 53. However, this requires special equipment to perform welding and also requires a larger number of production steps for the welding operation, leading to increased production costs. Furthermore, extra space is required to provide for welding spots, leading to larger dimensions for stacked assembly 51.

SUMMARY OF THE INVENTION

The object of the present invention is to provide a stacked assembly that can prevent interruptions and delays of production operations, that can reduce production costs, and that can provide a more compact design.

In order to achieve the objects, the present invention provides a stacked assembly comprising a bus bar substrate including a bus bar fixed to an insulative substrate; and an insulative plate having an upper surface on which an electrical circuit is formed, a plurality (two or more) of projections are formed from the bus bar and extend upwardly above the insulative substrate, projection entry sections are formed on the insulative plate and correspond in location and number to the projections on the insulative substrate, such that the insulative plate is fixed onto the bus bar substrate by having the projections mate with the projection entry sections.

Preferably, the stacked assembly has two projections and those two projections are positioned on the bus bar substrate at points which correspond to the opposite corners of the insulative plate.

More preferably, there are four projections, one corresponding to each corner of the insulative plate.

It is also preferred that the projection entry sections on the insulate plate fully enclose and insulate the projections to prevent contact with the wire cores which are mounted on the insulative plate.

According to the present invention, the insulative plate is pressed against the bus bar substrate so that the projections are pushed into the projection entry section, thus reliably fixing the plate onto the bus bar substrate. As a result, interruptions and delays in assembly resulting from the bus bar substrate disengaging from the insulative plate are avoided.

Also, the need for dedicated equipment required for fixing the insulative plate onto the bus bar substrate through welding is eliminated, thus reducing the number of production steps. As a result, production costs can be reduced.

Furthermore, the need for extra space on the stacked assembly for weld spots is eliminated. This allows the stacked assembly and the electrical connection box to be made more compact.

Another advantage of the present invention is that the projections are formed from the bus bar. This provides a cost savings to the manufacture in that the bus bar is already present in the substrate assembly and no additional elements need be added.

BRIEF DESCRIPTION OF THE DRAWINGS

These and other aspects of the present invention may be more fully understood by reference to one or more of the following drawings wherein.

DETAILED DESCRIPTION OF THE INVENTION

Figure 1:
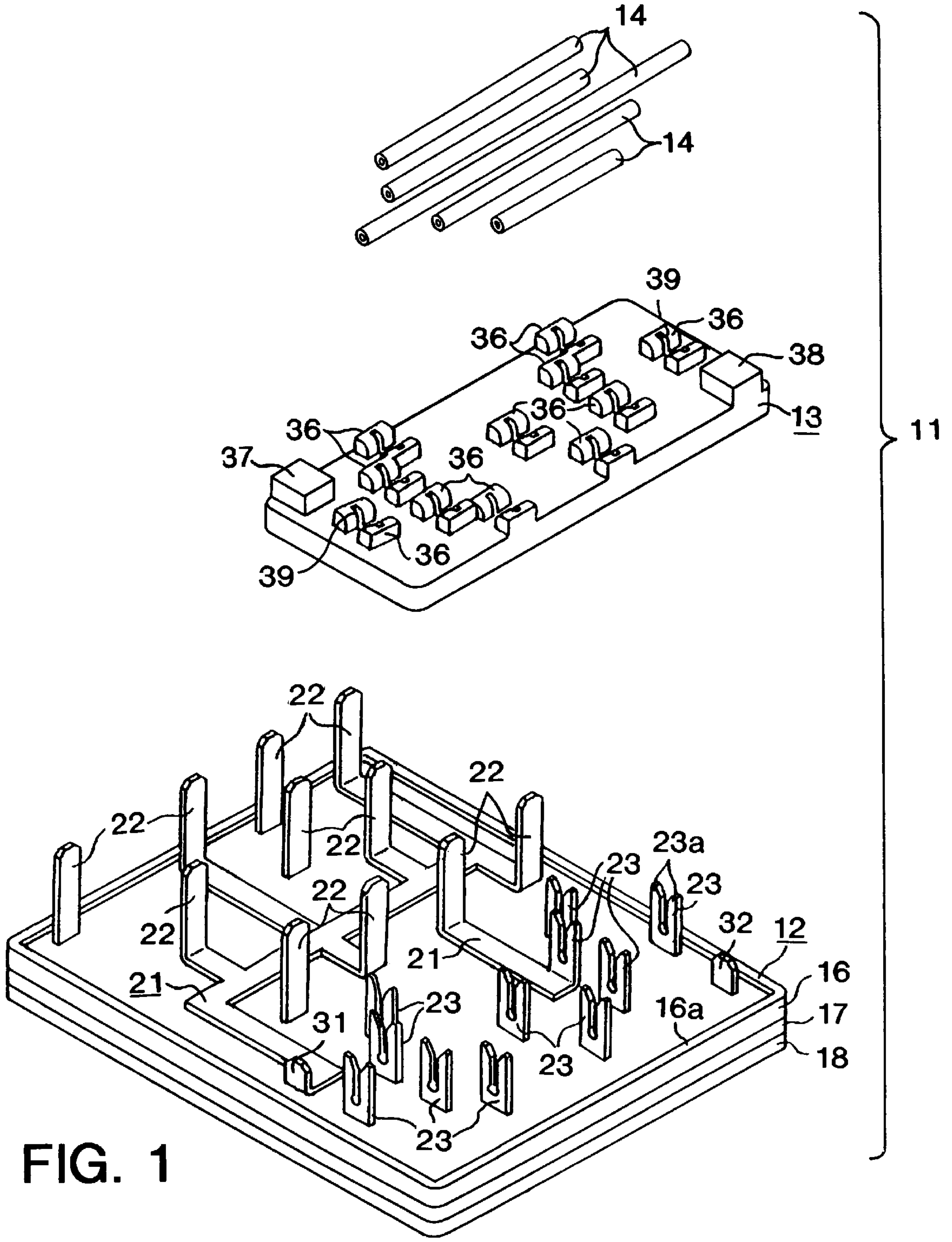
FIG. 1 is an exploded perspective drawing showing an embodiment of the stacked assembly according to the present invention.
Figure 2:
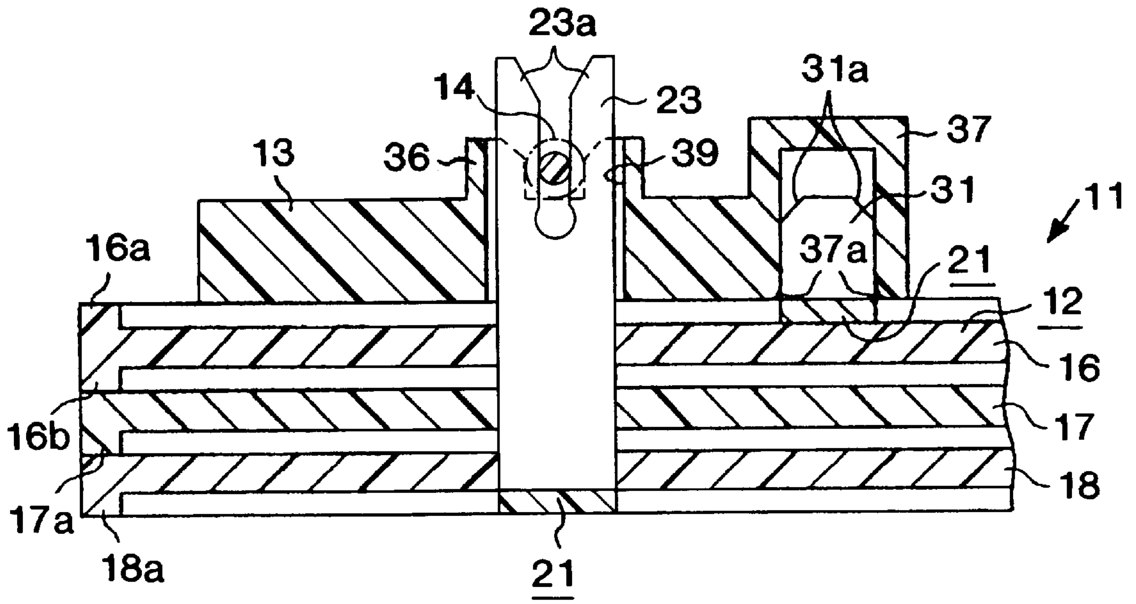
FIG. 2 is a cross-section drawing of the same embodiment.
Figure 3:
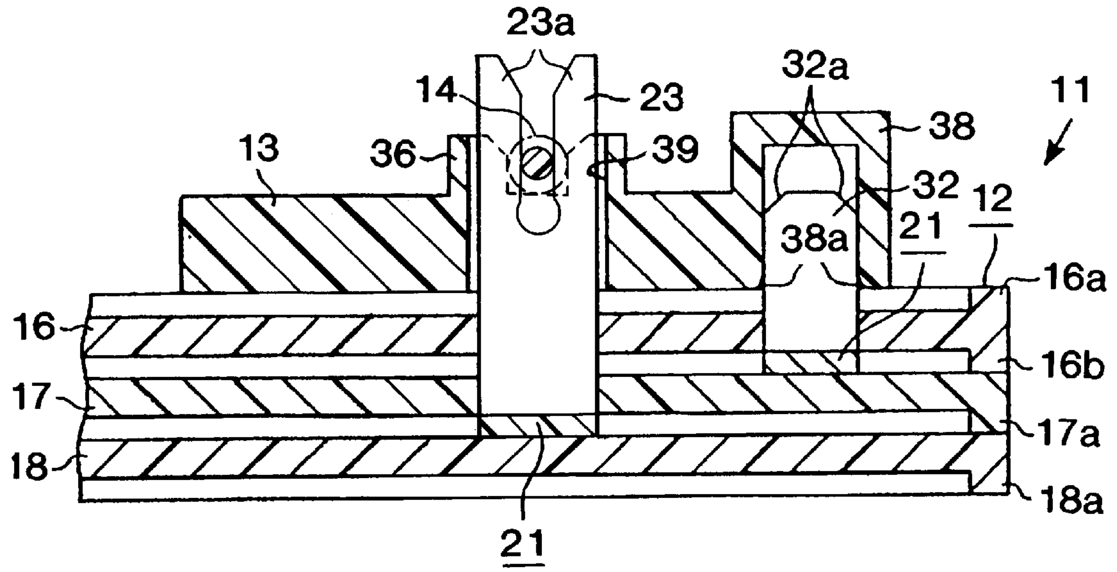
FIG. 3 is a cross-section drawing of the same embodiment.

The following is a description, with references to FIG. 1 through FIG. 3, of an embodiment of a stacked assembly housed in an electrical connection box according to the present invention.

FIG. 1 shows an exploded perspective drawing of a stacked assembly according to the present invention. In FIG. 1, stacked assembly 11 includes bus bar stacked substrate 12, insulative plate 13, and a plurality of solid-core wires 14.

Bus bar stacked substrate 12 forms a part of an internal circuit and includes a plurality of insulative substrates 16, 17, 18. Ribs 16*a*, 16*b* are formed on the upper portion and the lower portion of the upper perimeter of insulative substrate 16, respectively. Ribs 17*a*, 18*a* are formed on the lower portions of the outer perimeters of insulative substrates 17, 18. Bus bars 21 are fixed above and below insulative substrate 16 and below insulative substrates 17 and 18 in the space formed by ribs 16*a*, 16*b*, 17*a*, 18*a*, when insulative substrates 16, 17, 18 are stacked. Bus bars 21 are formed with plate-shaped bus bar tab 22 bent perpendicular to the direction in which bus bar 21 is laid and pincer-shaped bus bar tab 23 having supporting section 23*a* for making an electrical contact with solid-core wire 14. Bus bar tab 22 is used for connections with electronic components.

Each bus bar 21 which is fixed on top of insulative substrate 16 is formed with plate-shaped projection 31 bent perpendicular to the direction in which bus bar 21 is laid (see FIGS. 1 and 2). Similarly, each bus bar 21 fixed below insulative substrate 16 is formed with plate-shaped projection 32 which extends upwardly through insulative substrate 16 (see FIGS. 1 and 3). Tapered sections 31*a* and 32*a* are formed at the ends of projections 31, 32 and serve as guides for projections 31, 32 in the projection entry sections.

Insulative plate 13 is mounted on bus bar stacked substrate 12. Insulative plate 13 is formed in a plate shape that covers that portion of insulative substrate 16, which has bus bar tabs 23 and projections 31, 32. Tab holders 36 and projection entry sections 37, 38 are formed so that they are aligned with the positions of bus bar tabs 23 and projections 31, 32, respectively.

Referring now to FIGS. 2 and 3, tab holders 36 are projected upright from insulative plate 13. The inner wall surfaces thereof are formed smoothly going downward from the outside toward the center. Tab holders 36 are formed with tab insertion openings 39, which have widths that are slightly wider than the widths of bus bar tabs 23. When insulative plate 13 is mounted on bus bar stacked substrate 12, bus bar tabs 23 are inserted into tab insertion openings 39. When this is done, the ends of supporting sections 23*a* project slightly from the upper ends of tab holders 36.

Projection entry sections 37, 38 are projected upright from insulative plate 13 and are shaped like covered boxes so as to insulate projections 31, 32. The inner walls thereof are formed with widths that correspond to the widths of projections 31, 32.

Tapered sections 37*a*, 38*a* are formed in the lower end of the inner walls of projection entry sections 37, 38. When insulative plate 13 is pressed against bus bar stacked substrate 12, projections 31, 32 are inserted into projection entry sections 37, 38. When this takes place, projections 31, 32 are guided inside projection entry sections 37, 38 by the interaction between tapered sections 31*a*, 32*a* and tapered sections 37*a*, 38*a*. With projections 31, 32 pressed into the projection entry sections 37, 38 respectively, insulative plate 13 is fixed to bus bar stacked substrate 12 without the need for welding.

Single-core wires 14 are connected to bus bar tabs 23 by guiding single-core wire 14 onto supporting section 23*a*, which project slightly from the upper end of tab holder 36. When this takes place, the insulative cover of single-core wire 14 is cut away by supporting section 23*a* thereby forming an electrical connection between single-core wire 14, bus bar tab 23 and bus bar 21.

Thus, bus bar 21 and single-core wire 14 are electrically connected, an electronic circuit is formed on the upper surface of insulative plate 13, and an internal circuit is formed in stacked assembly 11.

Stacked assembly 11 is loosely fixed between an upper case and a lower case, not shown in the figures, and is then housed inside an electrical connection box.

As will be appreciated from the above discussion of the invention, work delays can be avoided. In the present invention, insulative plate 13 is pressed onto bus bar stacked substrate 12, projections 31, 32 are inserted into projection entry sections 37, 38, and insulative plate 13 is reliably fixed onto bus bar stacked substrate 12. Thus, insulative plate 13 is prevented from disengaging from bus bar stacked substrate 12, and delays and interruptions in work caused by bad connections between bus bars 21 and single-core wire 14 can be avoided.

It should also be noted that projections 31, 32 are oriented in the same manner as bus bar tabs 23. This prevents movement of insulative plate 13 in one direction and assists in alignment of single-core wire 14 with bus bar tabs 23.

In addition, the assembly process is simplified. Tapered sections 31*a*, 32*a*, 37*a*, 38*a* are formed on projections 31, 32 and in projection entry sections 37, 38, respectively. This allows projections 31, 32 to be inserted quickly and smoothly into projection entry sections 37, 38. Also, because of the gap between the side walls of projections 31, 32 and projection entry sections 37, 38 along the other axis, easy mating is also provided between the two elements.

Also, the internal circuit can be formed through a combination of bus bars 21 and single-core wires 14, thus increasing the degree of freedom provided for circuit design.

The embodiments of the present invention is not restricted to the embodiment described above, and the following modifications may also be implemented:

In the embodiment described above, the single-core wires laid on the upper surface of insulative plate 13 form an electrical circuit on this upper surface. However, the electrical circuit on the upper surface of an insulative plate can be formed using different bus bars fixed to this upper surface; or the electrical circuit can be formed using a printed circuit board.

In the embodiment described above, tapered sections 31*a*, 32*a*, 37*a*, 38*a* are formed on projections 31, 32 and projection entry sections 37, 38, respectively. However, similar tapered sections can be formed only on either projections 31, 32 or projection entry sections 37, 38. Furthermore, these tapered sections are not necessary.

Figure 4:
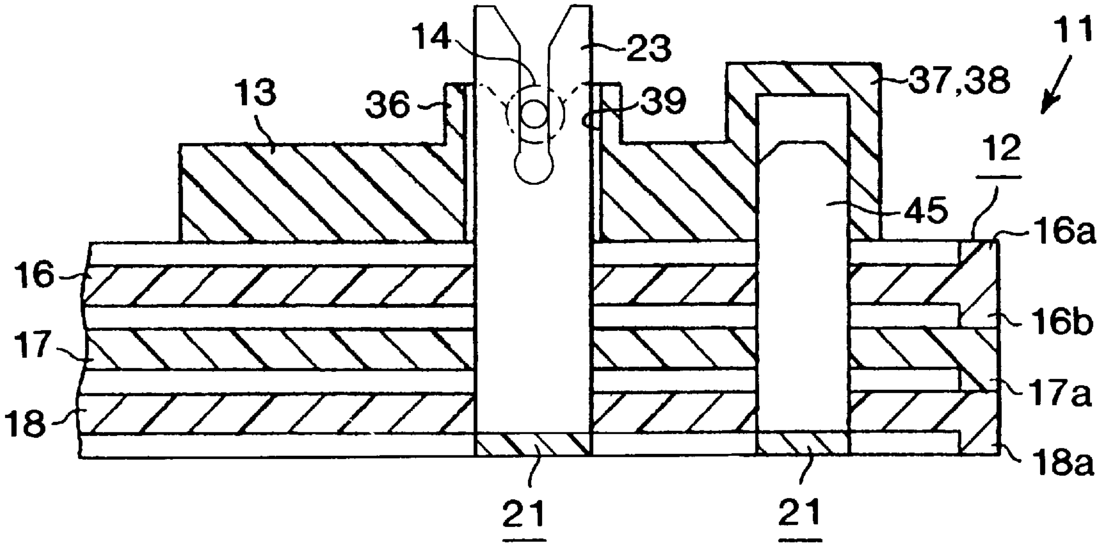
FIG. 4 is a cross-section drawing showing another embodiment of a stacked substrate according to the present invention.
Figure 5:
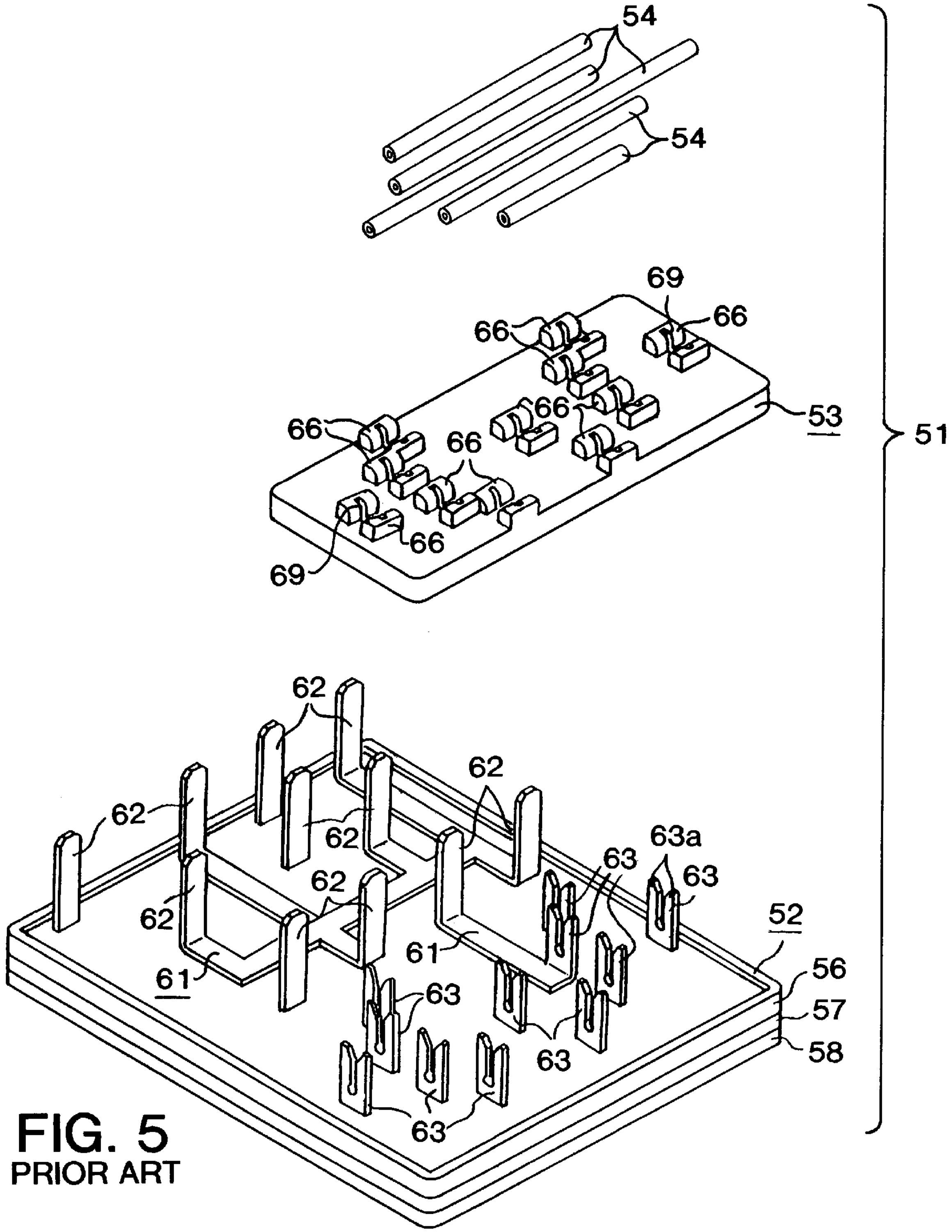
FIG. 5 PRIOR ART
FIG. 5 is an exploded perspective drawing showing a conventional stacked assembly.

In the embodiment described above, projections 31, 32 are formed on bus bars 21 fixed to the top or below insulative substrate 16. However, projections can be formed on a plurality of bus bars 21 selected from a single layer if a plurality of bus bars 21 are fixed at the same layer, or from the lowest level, like projection 45 in FIG. 4.

In the embodiment described above, projections 31, 32 are formed on bus bars 21 fixed above and below insulative substrate 16. However, a plurality of projections can be formed only on a single selected bus bar 21.

In the embodiment described above, two projections 31, 32 are formed, but any number of projections can be formed as long as there is a plurality.

While only a limited number of specific embodiments of the present invention have been expressly disclosed, it is, nonetheless, to be broadly construed, and not to be limited except by the character of the claims appended hereto.

What I claim is:

1. A stacked assembly comprising a stacked substrate including at least one bus bar fixed to an insulative substrate, an insulative plate having an upper surface with an electrical circuit thereon, a plurality of projections formed from and extending from said bus bar, a corresponding plurality of projection entry sections on said insulative plate, said insulative plate fixed onto said stacked substrate by said projections inserted into said projection entry sections, wherein said projection entry sections cover said projections when said projections are inserted into said projection entry sections.

2. The stacked assembly of claim 1 wherein there is a plurality of bus bars fixed to said insulative substrate.

3. A stacked assembly comprising a stacked substrate including a plurality of bus bars fixed to a plurality of insulative substrates, an insulative substrate having an upper surface on which an electrical circuit is formed, at least two of said bus bars having projections which are formed from and extending upward from said bus bar projection entry sections on an insulative plate corresponding to said projections in number and location, said insulative plate being fixed onto said stacked substrate by said projections in said projection entry sections, wherein said projection entry sections cover said projections when said projections are inserted into said projection entry sections.

* * * * *